Feb. 8, 1949.  J. T. LEONARD  2,461,332
LUBRICANT COMPRESSOR
Filed Dec. 1, 1944
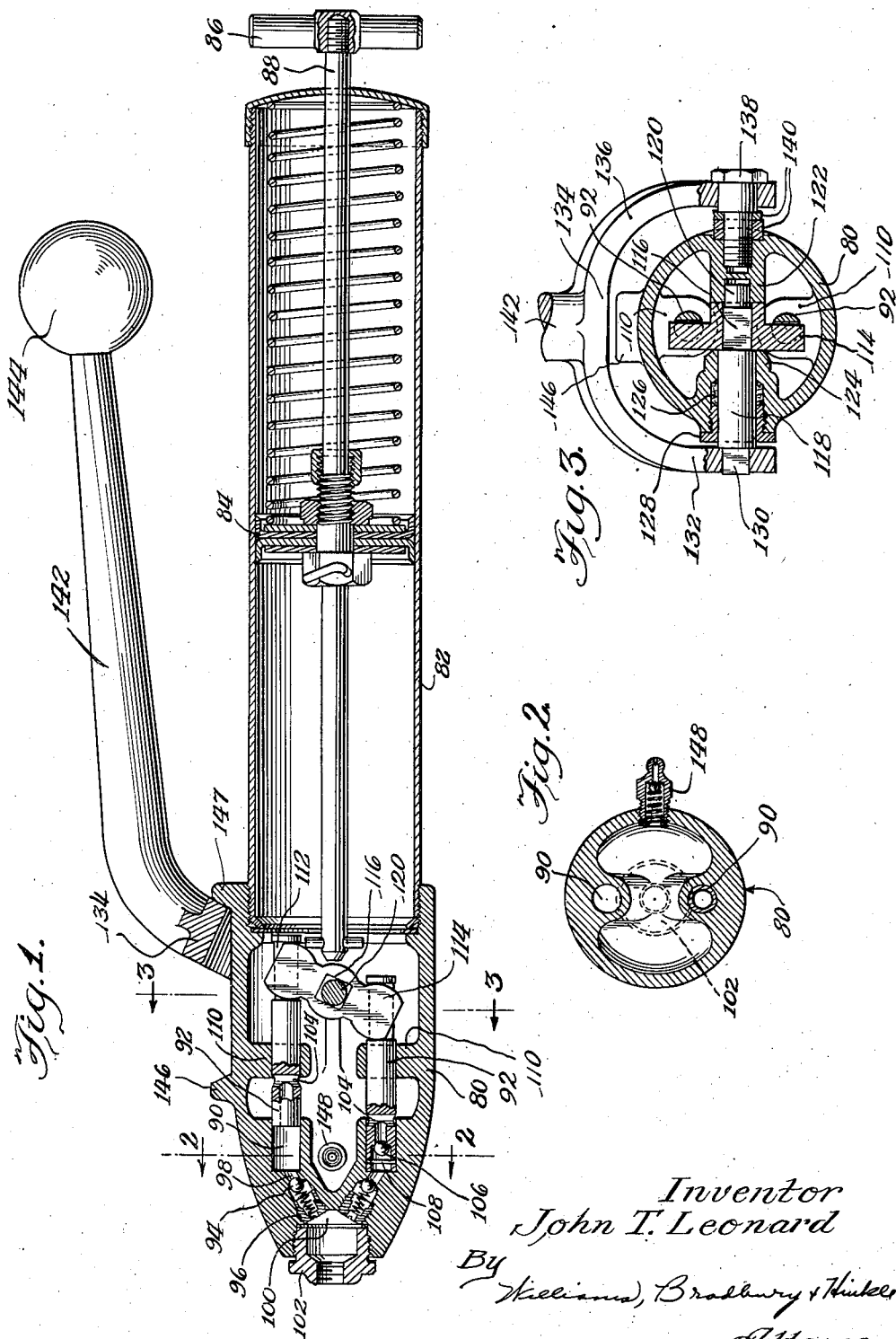
Inventor
John T. Leonard
By Williams, Bradbury & Hinkle
Attorneys Patented Feb. 8, 1949

2,461,332

UNITED STATES PATENT OFFICE 2,461,332

LUBRICANT COMPRESSOR

John T. Leonard, Evanston, Ill.

Application December 1, 1944, Serial No. 566,169

1 Claim. (Cl. 103—183)

My invention relates generally to lubricant compressors, and more particularly to hand operated double acting lubricant compressors for use in centralized lubricating systems, as well as for general use.

It is an object of my invention to provide a hand operated lubricant compressor having two pumping cylinders and plungers alternately operable by means of a single handle, whereby by swinging the operating handle back and forth, lubricant is discharged from the compressor on both the forward and return strokes.

A further object is to provide an improved lubricant compressor which is easily operable, is simple in construction, and which may be economically manufactured.

Other objects will appear from the following description, reference being had to the accompanying drawings, in which:

Fig. 1 is a central longitudinal sectional view of the improved hand operated compressor; and Figs. 2 and 3 are transverse sectional views thereof, taken on the lines 2—2 and 3—3, respectively, of Fig. 1.

In Figs. 1, 2 and 3, the invention is shown as incorporated in a hand operated portable lubricant compressor or grease gun, comprising a head casting 80 one end of which is suitably threaded to receive a reservoir barrel 82. This barrel contains a conventional spring pressed follower piston 84 which may be retracted by means of a handle 86 attached to a rod 88 passing through the follower piston 84.

The head 80 of the grease gun is provided with two similar cylinders 90 in which plungers 92 are reciprocable. Spring pressed outlet check valves 94, held in place by threaded hollow sleeves 96, normally close the ends of outlet ports 98. The lubricant flowing past the check valves 94 is discharged through the sleeves 96 into a space 100, into which a suitable bushing 102 is threaded, this bushing being threaded for the reception of a nozzle, or of the usual flexible hose, at the end of which there is the usual coupling for attachment to the lubricant receiving fittings.

Each of the plungers 92 is provided with a T-shaped passageway 104, the end of this passageway which opens into the cylinder 90 being enlarged to form a chamber for a check valve 106 which is retained in the chamber by a transverse pin 108. The plungers 92 are guided in bores formed in lugs 110, which are integral with the head 80. The outer ends of the plungers 92 have recesses or notches 112 formed therein for the reception of the rounded ends of an operating lever 114.

The lever 114 has a squared opening in its center for the reception of the squared portion 116 of an operating shaft 118. This shaft has a cylindrical end portion 120 which projects into a suitable bearing opening formed in a lug 122 of the casting 80, and also has a bearing in a bore formed in a lug 124, likewise formed integrally with the head casting 80. Leakage of lubricant around the large diameter portion of shaft 118 is prevented by packing 126 held in place by a packing gland 128. The outer end of the shaft 118 has a squared portion 130 which is fitted into a complementally shaped opening in the arm 132 of a yoke 134. The other arm 136 of the yoke 134 is pivoted on a shouldered stud 138 which is threaded in the boss 122. A pair of washers 140 are interposed between the shoulder of the stud 138 and the body casting 80. The yoke 134 may be in the form of a casting or forging and have a handle 142 terminating in the ball grip 144, formed integrally therewith.

The provision of the washers 140 makes it possible, upon removal of the stud 138 and these washers, to slide the yoke sidewardly and disengage the yoke arm 132 from the squared end 130 of the operating shaft 118, thereby permitting disassembly of the handle and yoke from the head 80. The stroke of the operating handle 142 is limited by stop lugs 146 and 147 formed on the casting 80. The reservoir of the compressor may conveniently be filled through a check valved lubricant receiving fitting 148 of any suitable construction, this fitting being threaded in the head casting 80 in the position best shown in Figs. 1 and 2. Due to its location, the lubricant supplied to the grease gun will tend to purge the interior of the head casting 80 of air which may have collected therein, forcing this air into the reservoir barrel 82.

In using the grease gun, it is filled by attachment of a suitable coupler to the fitting 148, the coupler being connected to a suitable source of lubricant under pressure. As the lubricant is forced into the grease gun, the follower piston is forced to the right (Fig. 1) against the force of its spring until the latter is compressed. The gun is then in condition for use, and assuming that it is provided with a suitable coupler and nozzle attached to the bushing 102, it may be used in the customary manner by reciprocating the handle 142 through an angle determined by the limit stops 146 and 147. It will be noted that lubricant is discharged upon both the forward and return strokes of the handle so that the discharge will be in a substantially continuously flowing stream. In view of the fact that both the forward and return strokes are power strokes, approximately twice as much lubricant may be discharged in a given interval of time as compared with a conventional single acting grease gun, or the lubricant may be discharged at substantially twice the pressure of the conventional gun, without appreciably increasing the effort required of the operator.

While I have shown and described a particular embodiment of my invention, it will be apparent that numerous variations and modifications thereof may be made without departing from the underlying principles of the invention. I therefore desire, by the following claim, to include within the scope of my invention all such variations and modifications by which substantially the results of my invention may be obtained through the use of substantially the same or equivalent means.

I claim:

A portable lubricant compressor comprising, a body having a passageway for the reception of lubricant and having two cylinders therein communicating with the passageway, an outlet check valve for each of the cylinders, plungers reciprocable in said cylinders, each plunger having a sidewardly open notch therein, and means for reciprocating the plungers to discharge lubricant from the cylinders past the check valves, said means comprising a shaft mounted for oscillation in the body, said shaft having a non-circular end portion projecting from the body, a handle having a generally semicircular yoke, one arm of the yoke having a complementally shaped opening receiving the non-circular portion of the shaft, a shouldered stud threaded in the body in axial alignment with the shaft and forming a bearing for the other arm of the yoke, and an operating lever non-rotatably secured to the shaft and having rounded ends respectively bearing in the notches in the plungers.

JOHN T. LEONARD.

REFERENCES CITED

The following references are of record in the file of this patent:

UNITED STATES PATENTS

| Number | Name | Date |
| --- | --- | --- |
| 1,538,911 | Taylor | May 26, 1925 |
| 1,739,438 | Butler | Dec. 10, 1929 |
| 2,037,434 | Pfauser | Apr. 14, 1936 |
| 2,187,036 | Kerber | Jan. 16, 1940 |
| 2,384,824 | Eitner | Sept. 18, 1945 |

FOREIGN PATENTS

| Number | Country | Date |
| --- | --- | --- |
| 812,675 | France | 1937 |